Figure 1:
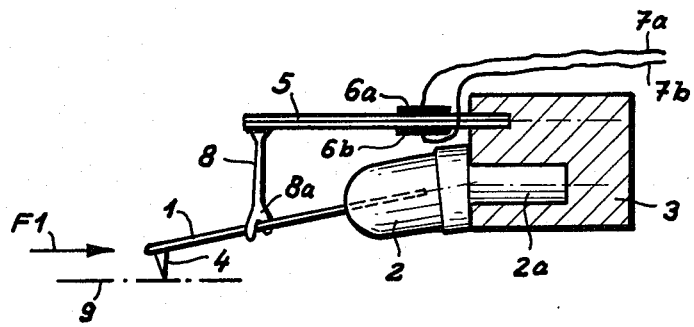

United States Patent [19]

Saljé et al.

[11] 4,106,333
[45] Aug. 15, 1978

[54] METHOD OF AND APPARATUS FOR EXAMINING THE ROUGHNESS OF SURFACES

[75] Inventors: Ernst Saljé, Schulheide 4, D 2106 Bendestorf, Germany; Heinrich Mushardt, Ahstedt, Germany

[73] Assignee: Ernst Saljé, Bendestorf, Germany

[21] Appl. No.: 712,829

[22] Filed: Aug. 9, 1976

[30] Foreign Application Priority Data

Aug. 12, 1975 [DE] Fed. Rep. of Germany ....... 2535912

[51] Int. Cl.² .............................................. G01B 5/28
[52] U.S. Cl. ....................................................... 73/105
[58] Field of Search ......................................... 73/105

[56] References Cited

U.S. PATENT DOCUMENTS

| 2,240,278 | 4/1941 | Abbott | 73/105 |
| 2,405,133 | 8/1946 | Brown | 73/105 |
| 2,460,726 | 2/1949 | Arndt, Jr. | 73/105 |
| 2,471,009 | 5/1949 | Reason | 73/105 |
| 2,991,331 | 7/1961 | Ross | 179/100.41 R |

Primary Examiner—Charles A. Ruehl
Attorney, Agent, or Firm—Holman & Stern

[57] ABSTRACT

The invention provides a method of examining roughness of a surface of a workpiece, comprising: scanning said surface by means of a resiliently mounted support element during linear relative movement between a sensing element and said surface whereby self-oscillations are generated at the sensing element or at parts in connection therewith by unevennesses of said surface; receiving said self-oscillations; and determining a value which corresponds at least approximately to the magnitude of the amplitudes of the oscillations, said value being a criterion of roughness of said surface. The invention also provides apparatus for examining roughness of a surface of a workpiece, comprising: a holder; a sensing element; a support for the sensing element; the sensing element being movably supported against a yielding resistance by the holder; and a receiver system for oscillations and adapted to deliver electrical signals at its output, the sensing element or the support therefor being connected with the receiver.

17 Claims, 3 Drawing Figures

METHOD OF AND APPARATUS FOR EXAMINING THE ROUGHNESS OF SURFACES

The invention relates to a method of and apparatus for examining workpiece surfaces, in particular surfaces treated by a grinding tool, in respect of their roughness.

Roughness is an important quality feature of workpieces ground or finely treated. If it is possible to determine change of the roughness as a function of grinding time, important information is obtained therefrom at the same time in respect of the state of a grinding disc and the changes of this state, so that also the end of the useful life of the grinding disc can be detected. It is always desirable to detect the roughness rapidly and possibly even during the treatment process, in particular during a grinding operation, in order to be able to supervise thereby the progress of the treatment process and the useful life condition of the grinding disc. Existing measuring methods do not permit this. In known methods the detection of the roughness is effected outside the treatment machine in a separate apparatus. The latter comprises a sensing point which is guided over the surface of a specimen and which influences associated elements in such a manner that the profile of the surface is reproduced on a record carrier. In such apparatus the sensing element follows the surface contour closely, in order to obtain an extremely accurate geometrical description of the surface topography. The diagram resulting therefrom must subsequently be evaluated.

The present invention renders it possible to obtain in an advantageous manner and without great expenditure of time criterion for the roughness of workpiece surfaces so that the state of the workpiece surfaces in respect of the roughness can always be assessed quickly and in particular even during a treatment process and also conclusions can be reached in respect of the state of a treatment tool such as a grinding disc. The criterion is suitable for itself being used for influencing a treatment process. Furthermore the invention also provides an advantageous device which particularly satisfactorily fulfils the demands of the practice, for examining the roughness of a surface.

The invention resides in that mechanical oscillations occurring during the scanning process in the sensing element or in parts connected thereto are received, that thereby a value is determined which corresponds at least approximately to the amplitude of these oscillations and that this amplitude value is utilized as a criterion for the roughness of the surface.

Thus in accordance with one aspect of the present invention, there is provided a method of examining roughness of a surface of a workpiece, comprising: scanning said surface by means of a resiliently mounted support element during linear relative movement between a sensing element and said surface whereby self-oscillations are generated at the sensing element or at parts in connection therewith by unevennesses of said surface; receiving said self-oscillations; and determining a value which corresponds at least approximately to the magnitude of the amplitudes of the oscillations, said value being a criterion of roughness of said surface.

It was found in the invention that a correlation exists between the amplitudes of self-oscillations of the sensing element occurring during the scanning process and the roughness of the scanned surface. The information content of the detected amplitude value of these self-oscillations is adequate for permitting the roughness of a surface to be satisfactorily assessed in a very large number of practical cases, so that the obtaining of a pictorial reproduction of the surface profile and the time-consuming evaluation thereof are unnecessary. The method is also suitable to be performed under shop-floor conditions and even directly on a treatment machine, in particular a grinding machine, so that the special conditions of a testing chamber are not required.

An indication of the magnitude of the oscillation amplitudes is basically possible in various ways. In particular the invention provides that an electrical signal representing the amplitude value is produced in conjunction with the reception of the mechanical oscillations. Such a signal is well suited for an indication as well as for further processing.

Furthermore preferably at least one quantity or adjustment influencing a treatment operation is controlled or regulated in response to the magnitude of the oscillation amplitude or a signal representing the same.

In this manner, in particular a grinding process can be so controlled that the workpiece roughness remains always below a predeterminable maximum value. A quantity control at the workpieces as well as a supervision of the useful life of the grinding disc can be obtained. Based on the respective results which are determined during a treatment or e.g. immediately after the latter, grading of the workpieces may be effected. Furthermore, when a predetermined limit value of the oscillation amplitude is obtained, a signal for dressing a grinding disc may be initiated.

The roughness of a ground surface depends upon the feed and the cutting space topography of the grinding disc. When the latter changes because of wear, its influence on the roughness can be compensated by the feed. This, too, can be performed in response to the respective detected value.

In a multiple-stage treatment process the over-dimension of the workpiece is to be ground away during roughing down and the required workpiece roughness at the desired dimensional accuracy is to be obtained during trimming and spark eroding. When the method according to the invention is used, scanning of the surface during the trimming can indicate whether and when the desired roughness has been attained. The trimming process can be controlled in accordance therewith. By the use of further data processing an optimizing control may even be obtained.

In accordance with another aspect of the present invention, there is provided apparatus for examining roughness of a surface of a workpiece, comprising: a holder; a sensing element; a support for the sensing element; the sensing element being movably supported against a yielding resistance by the holder; and a receiver system for oscillations and adapted to deliver electrical signals at its output, the sensing element or the support therefor being connected with the receiver. The receiver system may be a piezo-electric receiver system, an inductive receiver system or a capacitative receiver system.

In an advantageous embodiment of the apparatus, a support element is provided at one end with a sensing pin and is resiliently embedded at the other end in a base body as well as being coupled to the receiver system by means of a connecting member.

In particular a bending plate of piezo-ceramic material may be held in the base body and connected to the support element by a rail in the region of its free portion.

The signal delivered by the receiver system is advantageously amplified and rectified and may be supplied, under certain circumstances through a filter, to an element for receiving and/or indicating the quantity supplied.

Figure 2:
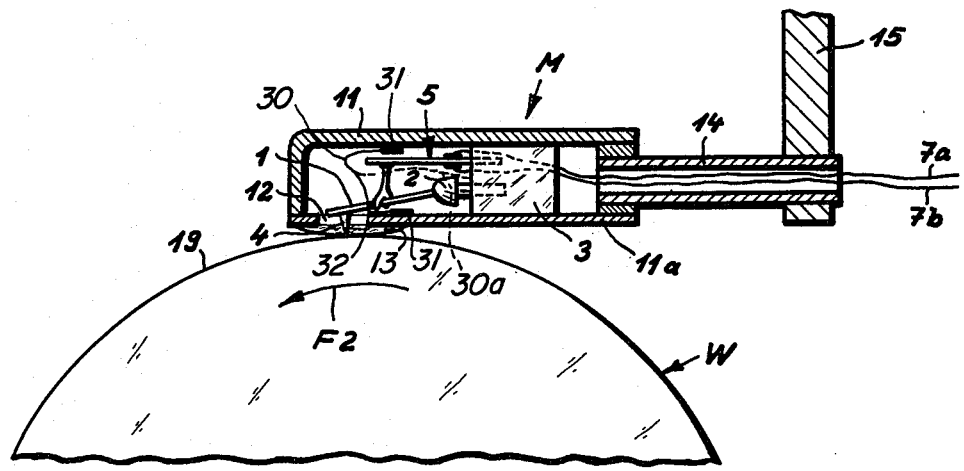

The invention is further described below by way of example with reference to the accompanying drawings, in which:

FIG. 1 is a diagrammatic view, partly in section, of a device according to the invention;

FIG. 2 a view, partly in section, of a device according to the invention; and

Figure 3:
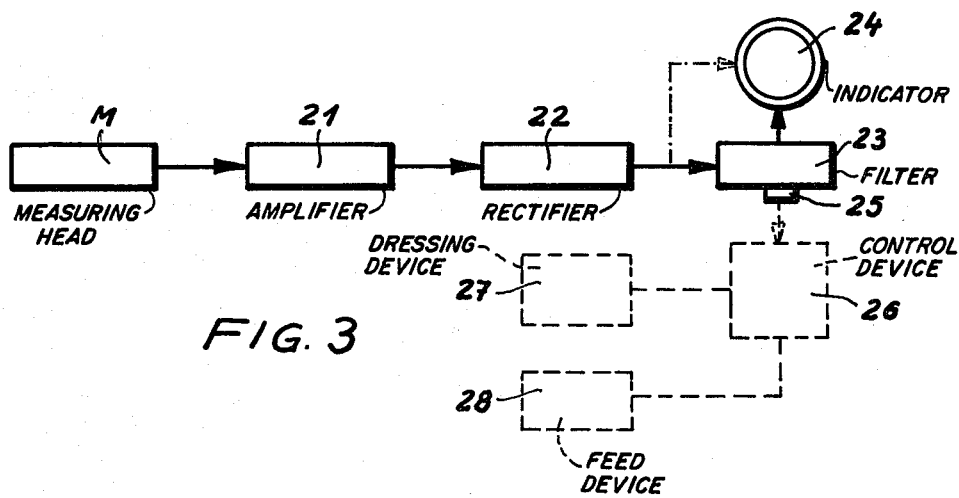

FIG. 3 a block circuit diagram of apparatus for processing a signal from the device of FIG. 1 or 2.

Referring to FIG. 1, the device shown therein comprises a support element 1, preferably a rod or a light metal tube, embedded at one end, referred to as its rear end, in a block 2 of rubber or other resilient material. Thus the support element 1 is yieldingly held by the block 2. The rubber block 2 is provided with a projection 2a engaged in a rigid base body 3. Thus the block 2 is fixed to the base body 3. The base body 3 may be produced from a light metal or synthetic resin and has a suitable external shape. The end of the support element 1 remote from its rear end is referred to as the forward end of the support element. A sensing pin 4 is attached to the forward end of the support element 1.

Above the support element 1, there is located a bending plate 5 of piezo-ceramic material which is held at one end in the base body 3, the other end of the bending plate being free. The bending plate 5 is provided with two contacts 6a, 6b having leads 7a, 7b extending therefrom. The bending plate 5 has attached thereto, adjacent its free end, a rail 8 of stiff material. The rail 8 has a lower end forming a forked head 8a which engages the support element 1. The rail 8 serves to transmit oscillations of the support element 1 to the bending plate 5. Thus the device comprises a receiver system for mechanical oscillations, the system comprising the bending plate 5 and the leads 7a, 7b constituting an output of the receiver system. The receiver system delivers at its output electrical signals which may have a relatively high frequency. Alternatively, the device may comprise a differently constructed receiver system, in particular a receiver system constructed in the manner of an audio sound head.

As illustrated in FIG. 3, the signals delivered from the bending plate 5 through the leads 7a, 7b are preferably amplified in an amplifier 21, then supplied to a rectifier 22 and indicated, optionally with the intervention of a filter 23, by an apparatus 24, for example a pointer instrument or number tubes. FIG. 3 indicates by a dash-dotted line a direct connection between the rectifier 22 and the indicator apparatus 24.

The sensing pin 4, which is slidingly guided in the direction of the arrow F1 over the surface indicated by the dash-dotted line 9 of a test specimen, can follow to a certain extent the contour of the specimen, is excited to self-oscillations the amplitude of which is a criterion for assessing the roughness of the scanned surface. For the same basic characteristic of the surface and the same direction of the sensing movement relative to machining grooves present on the specimen, a rapid assessment particularly well satisfying the demands of the practice, of the roughness has thus been rendered possible for any desired number of equal or different workpieces.

The device shown in FIG. 2 is similar to the device shown in FIG. 1 except as described below and in FIGS. 1 and 2 like reference numerals denote like parts. Referring to FIG. 2, in the device shown therein, the base body 3 with the support element 1 and the receiver system 5 is accommodated in a housing 11 having a lower cover plate 11a. The housing 11 is sealed except for an opening 12 on its underside. The sensing pin 4 extends through the opening 12. On each side of the opening 12 there are located on the housing 11 or the lower cover plate 11a two shoes 13 which, when the device is used, come to rest on a surface 19 of a specimen W, e.g. a cylindrical workpiece. The resiliently held support element 1 and the receiver system 5 are built into the housing 11, and adjusted therein so that, when the shoes 13 rest on the surface 19, the sensing pin 4 which projected downwardly heretofore slightly beyond the shoes, recedes upwardly by such an amount that a desired sensing force with respect to the surface 19 is attained. This may be obtained inter alia by the suitable choice of the resilient body 2 (compare FIG. 1) and the mounting thereof.

The housing 11 and the parts accommodated therein constitute a measuring head M. The measuring head M may be placed by the shoes 13 against the workpiece surface 19, e.g. by the force of a spring (not illustrated) and provided in the mounting of the measuring head, or by its own weight. Alternatively the shoes 13 may be omitted when the pressing force of the sensing pin 4 on the workpiece surface 19 is adjusted by a defined feed in respect of the latter in a predetermined manner.

The sensing movement during the testing process can be performed either by the workpiece W, e.g. by a rotation of the latter in the direction of the arrow F2 through a sufficient amount the magnitude of which may be predeterminable under certain circumstances, or by the device.

In the device of FIG. 2, the measuring head M is provided with a tubular projection 14 through which the leads 7a, 7b are guided and which is held by an arm 15. The arm 15 may be adjustably or displaceably attached to a stand or a guide of a stand so that the measuring head M can be deposited in the respective desired manner on the workpiece to be tested and can also be displaced relatively thereto, for example in the axial direction of the workpiece W under the conditions illustrated in FIG. 2, in order that this can be examined at various locations. For the depositing as well as for a displacement movement, appropriate devices and under certain circumstances motor drives may be provided. The device may be so constructed that the sensing force at the sensing pin and the scanning speed are always constant. Alternatively it is also possible to take different conditions into account by calibration.

The measuring head M can be constructed without difficulty in such a manner that sensitive parts thereof are protected against damage and soiling. For use under wet conditions the sensing pin may be guided through a sleeve out of the housing 11 so that the latter is completely closed. When the receiver system is moisture- or oil-sensitive, protection may alternatively be provided by a membrane 30 which surrounds e.g. the support element and/or the connecting member. Membrane 30 is secured to the housing 11 at 31 with the support element 1 extending through an opening 32 such that the receiver system 5 is protected. A further embodiment has the membrane [shown as 30a in FIG. 2] surrounding only a portion of connecting rail 8. Furthermore it may be advantageous to guide air through the housing of the measuring head or to dispose an air nozzle in front of the sensing pin, in order to obtain thereby a protective effect and to prevent an undesirable entry of soiling particles or liquid into the measuring head.

The apparatus shown in FIG. 3 further comprises an output 25 for an amplitude value signal, the output 25 lying parallel to the output of the indicator instrument 24 in order to indicate that this signal can be utilized still further. Thus the latter may be supplied to a control or regulating device 26, e.g. for switching on a dressing device 27 or a grinding machine in response to a limit value adjustable at this device being exceeded, or in order to influence a feed device 28 of a grinding machine in a pre-settable manner.

As has been explained, the assessment of the roughness of the surface of a specimen starts from the magnitude of the self-oscillations which occur at a sensing point or another sensing element when it moves relatively to the surface of the specimen. The frequency of these self-oscillations may amount to several thousand Hertz and may lie, for example, about 7000 Hz. Compared with known methods and devices, the invention renders possible a considerably increased scanning speed, so that a workpiece can be scanned even during treatment thereof and a value can be determined for the roughness present at the respective instant, which is impossible with known apparatus. In particular such a roughness examination can be performed during a running grinding process, for example an external round grinding process. In this case scanning speeds of for example from 0.3 to 1 m/s are possible corresponding to the peripheral speed of the workpiece. The measuring period may be very short and amount to e.g. 0.5 s. The point radius of a sensing point may have a value of for example 15 μm or more. Also a knife edge may be used as the sensing element.

I claim:

1. A method of examining roughness of a surface of a workpiece utilizing a sensing element means for providing mechanical movement in response to the roughness of said surface, and support element means for holding said sensing element means and having a natural frequency of oscillation, said method comprising the steps of:
    effecting relative movement between said sensing element means and said workpiece surface;
    engaging said workpiece surface by said sensing element means, causing said sensing element means to be stimulated by said relative movement such that said support element means oscillates at said natural frequency; and
    producing a value corresponding to the magnitude of said oscillation, said value indicative of the roughness of said surface.

2. A method according to claim 1, wherein the oscillation is received and the magnitude is determined during treatment of the workpiece to be examined.

3. A method according to claim 2, wherein at least one quantity or adjustment influencing treatment of the workpiece is regulated in response to the magnitude of said natural oscillation or a signal representing the latter.

4. A method according to claim 3, wherein said surface is a surface treated by a grinding tool.

5. An apparatus for examining roughness of a surface of a workpiece, comprising:
    sensing element means, in relative movement with said surface of said workpiece, for providing mechanical movement in response to the roughness of said surface;
    support element means for holding said sensing element means, and in combination therewith, having a natural frequency of oscillation and oscillating at said frequency in response to said mechanical movement of said sensing element means;
    block means for movably supporting said support element means against a yielding resistance; and
    receiver system means, responsive to said support element means oscillation, for providing an electrical indication of the amplitude of said oscillation as a criterion of said roughness.

6. Apparatus according to claim 5, wherein the receiver system means is a piezo-electrical receiver system.

7. Apparatus according to claim 5, wherein the sensing element means is a sensing pin, said support element means, having two ends at one end thereof holding the sensing pin and the other end thereof is resiliently held by said block means, said support element means is coupled to the receiver system means by a connecting member.

8. Apparatus according to claim 7, wherein the connecting member is a rail, said apparatus includes a body means for mounting said block means thereon and the receiver system means comprises a bending plate of piezo-ceramic material which is held in said body means and is connected by the rail to the support element means in the region of said sensing pin.

9. Apparatus according to claim 7, wherein the support element means is a light tube.

10. Apparatus according to claim 5, further comprising shoes which can be placed on a surface of the workpiece and between which the sensing element means is located.

11. Apparatus according to claim 5, wherein the receiver system means is connected to a rectifier by way of an amplifier, and an indicator means is provided for receiving and/or indicating an electrical quantity delivered from said rectifier.

12. Apparatus according to claim 11, wherein a filter is provided between the rectifier and said indicator means.

13. Apparatus according to claim 5, wherein the support element means and the receiver system means are enclosed in a housing and, together with the housing, constitute a measuring head.

14. Apparatus according to claim 13, wherein the measuring head is provided with membrane means for excluding dust and moisture therefrom.

15. The apparatus according to claim 5, wherein said support element means comprises a light tube.

16. The apparatus according to claim 5, wherein said means receiver system includes a casing means for protecting said receiver system against dust and moisture.

17. The apparatus according to claim 16, wherein said casing means includes a housing and a membrane means, provided within said housing, for providing a sealed passage for said sensing element means.

* * * * *